United States Patent
Sittisombut et al.

(10) Patent No.: US 11,509,719 B2
(45) Date of Patent: Nov. 22, 2022

(54) BLOCKCHAIN TECHNOLOGY IN DATA STORAGE SYSTEM

(71) Applicant: Seagate Technology LLC, Fremont, CA (US)

(72) Inventors: Chaiwat Sittisombut, Nakhon-Ratchasima (TH); Colin Thomson, Woodlands (SG)

(73) Assignee: Seagate Technology LLC, Fremont, CA (US)

( * ) Notice: Subject to any disclaimer, the term of this patent is extended or adjusted under 35 U.S.C. 154(b) by 42 days.

(21) Appl. No.: 17/111,170

(22) Filed: Dec. 3, 2020

(65) Prior Publication Data

US 2022/0182446 A1    Jun. 9, 2022

(51) Int. Cl.
| | |
|---|---|
| *G06F 15/16* | (2006.01) |
| *H04L 67/1097* | (2022.01) |
| *H04L 9/32* | (2006.01) |
| *H04L 67/1001* | (2022.01) |
| *H04L 9/00* | (2022.01) |

(52) U.S. Cl.
CPC ........ *H04L 67/1097* (2013.01); *H04L 9/3236* (2013.01); *H04L 67/1001* (2022.05); *H04L 9/50* (2022.05)

(58) Field of Classification Search
None
See application file for complete search history.

(56) References Cited

U.S. PATENT DOCUMENTS

| | | | |
|---|---|---|---|
| 9,569,771 | B2 | 2/2017 | Lesavich et al. |
| 9,881,176 | B2 | 1/2018 | Goldfarb et al. |
| 10,075,298 | B2 | 9/2018 | Struttmann |
| 10,114,970 | B2 | 10/2018 | Goldfarb et al. |
| 10,121,019 | B2 | 11/2018 | Struttmann |
| 10,192,073 | B2 | 1/2019 | Marin |
| 10,394,845 | B2 | 8/2019 | Madisetti et al. |
| 10,402,792 | B2 | 9/2019 | Lin et al. |
| 2017/0337534 | A1* | 11/2017 | Goeringer .......... H04L 63/0428 |
| 2018/0048461 | A1 | 2/2018 | Jutla et al. |
| 2018/0096175 | A1 | 4/2018 | Schmeling et al. |
| 2018/0205552 | A1 | 7/2018 | Struttmann et al. |
| 2018/0285996 | A1* | 10/2018 | Ma ...................... G06F 16/2428 |
| 2018/0336286 | A1* | 11/2018 | Shah ...................... G06Q 10/10 |
| 2019/0013933 | A1* | 1/2019 | Mercuri ................. G06F 16/27 |
| 2019/0044703 | A1 | 2/2019 | Smith |
| 2019/0057211 | A1 | 2/2019 | Wright et al. |
| 2019/0205558 | A1* | 7/2019 | Gonzales, Jr. ....... G06Q 20/389 |
| 2019/0266145 | A1 | 8/2019 | Qiu et al. |
| 2019/0312939 | A1* | 10/2019 | Noble .................. H04L 9/3239 |

(Continued)

OTHER PUBLICATIONS

Cachin, Christian; Architecture of the Hyperledger Blockchain Fabric; Jul. 2016; 4 pages.

(Continued)

*Primary Examiner* — Razu A Miah

(74) *Attorney, Agent, or Firm* — Christian W. Best

(57) ABSTRACT

Systems and methods are disclosed for implementing blockchain technology in a data storage system. In certain embodiments, a data storage device may upload a copy of a file to a cloud server for storage, and receive a network link to the copy of the file. The data storage device may then provide file metadata and the network link to a distributed ledger blockchain system to create a blockchain entry.

20 Claims, 6 Drawing Sheets

(56) References Cited

U.S. PATENT DOCUMENTS

2019/0356481 A1* 11/2019 Spector .............. G06Q 20/3674
2019/0358515 A1   11/2019 Tran et al.
2020/0128075 A1    4/2020 Tormasov et al.

OTHER PUBLICATIONS

Crosby, Michael, et al.; BlockChain Technology: Beyond Bitcoin; Applied innovation Review, Jun. 2016; 16 pages.
Dinh, Tien Tuan Anh, et al—Untangling Blockchain: A Data Processing View of Blockchain Systems; IEEE Transactions on Knowledge and Data Engineering, vol. 30, No. 7, Jul. 2018; 20 pages.
Lastovetska, Anastasiia; Blockchain Architecture Basics: Components, Structure, Benefits & Creation; May 8, 2020; https://mlsdev.com/blog/156-how-to-build-your-own-blockchain-architecture; 19 pages.
Mearian, Lucas; What is blockchain? The complete guide; Jan. 29, 2019; https://www.computerworld.com/article/3191077/what-is-blockchain-the-complete-guide.html; 12 pages.
Reiff, Nathan; Blockchain Explained; Feb. 1, 2020; https://www.investopedia.com/terms/b/blockchain.asp; 21 pages.
Yli-Huumo, Jesse, et al—Where Is Current Research on Blockchain Technology?—A Systematic Review; Oct. 3, 2016; 15 pages.

* cited by examiner

BLOCKCHAIN TECHNOLOGY IN DATA STORAGE SYSTEM

SUMMARY

In certain embodiments, a method may comprise receiving, at a data storage device, a data file to store; transmitting, from the data storage device to a cloud server, the data file; and receiving, at the data storage device from the cloud server, a network link to access the data file at the cloud server. The method may further comprise sending, from the data storage device to a blockchain node in a network, a request to generate a blockchain block corresponding to the data file, the request including the network link; receiving, at the data storage device from the blockchain node, a reference number corresponding to the blockchain block, the reference number enabling access to the blockchain block; and providing the reference number from the data storage device in response to receiving the data file to store.

In certain embodiments, a system may comprise a data storage drive including a data storage medium and a processor. The processor may be configured to receive a data file to store to the data storage medium; transmit the data file to a cloud server; and receive, from the cloud server, a network link to access the data file at the cloud server. The processor may be further configured to send, to a blockchain node in a network, a request to generate a blockchain block corresponding to the data file, the request including the network link; receive, from the blockchain node, a reference number corresponding to the blockchain block, the reference number enabling access to the blockchain block; and provide the reference number in response to receiving the data file to store.

In certain embodiments, a memory device may store instructions that, when executed, cause a processor to perform a method comprising receiving, at a data storage device, a data file to store; transmitting, from the data storage device to a cloud server, the data file; and receiving, at the data storage device from the cloud server, a network link to access the data file at the cloud server. The method may further include sending, from the data storage device to a blockchain node in a network, a request to generate a blockchain block corresponding to the data file, the request including the network link; receiving, at the data storage device from the blockchain node, a reference number corresponding to the blockchain block, the reference number enabling access to the blockchain block; and providing the reference number from the data storage device in response to receiving the data file to store.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules or nodes, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

Figure 1:
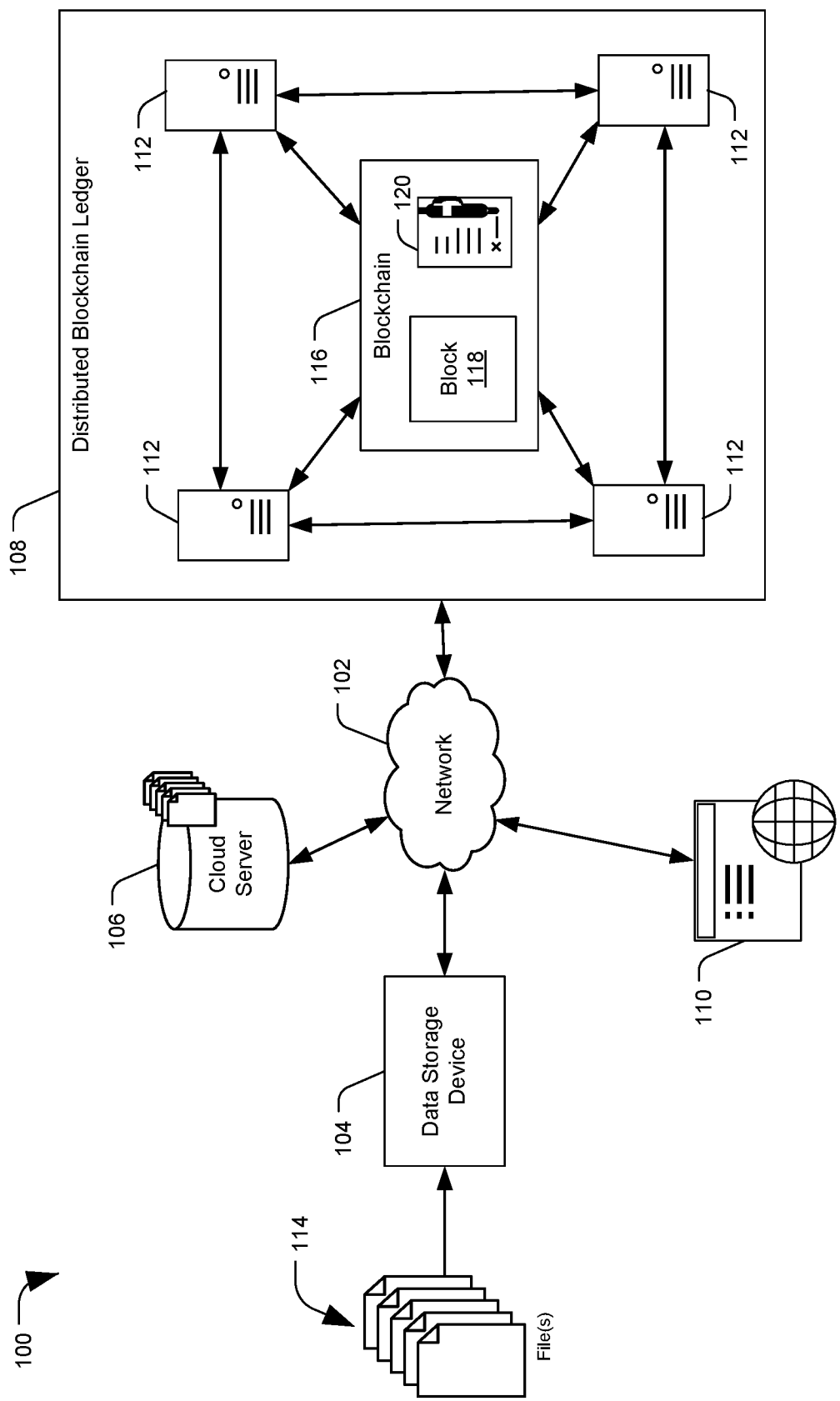
FIG. 1 is a diagram of a system configured to implement blockchain technology in a data storage system, in accordance with certain embodiments of the present disclosure.

FIG. 1 is a diagram of a system 100 configured to implement blockchain technology in a data storage system, in accordance with certain embodiments of the present disclosure. The system 100 may include a network 102, a data storage device (DSD) 104, a cloud server 106, a distributed blockchain ledger system 108 including a plurality of blockchain node computing systems 112, and a web application 110. The network 102 may include one or more local area networks (LANs) or wide area networks (WANs), for transmitting data between computing systems. The network 102 may include software and firmware to implement the network functionality, as well as physical components such as transmission lines, network towers, servers, routers, switches, and other systems. The network 102 may include the internet, home networks, business intranet systems, other networks, or a combination thereof. Components of system 100 such as the DSD 104, cloud server 106, blockchain nodes 112, and web application 110 may be connected to and communicate via the network 102.

The DSD 104 may include a device such as a storage drive or any other device which may be used to store or retrieve data, including a hard disc drive (HDD), solid-state drive (SSD), or hybrid drive. As used herein, a data storage drive may refer to a device specifically adapted for data storage and retrieval to a memory internal to the drive, not including more general purpose processing devices such as computers and smart devices, although the DSD 104 and the teachings herein are not limited to such drives. The DSD 104 may include an external or internal drive, a network-attached storage (NAS) drive, or other storage devices. In some examples, the data storage device 104 may include devices such as network-capable cameras, smart phones, voice recorders, or other devices capable of accepting or capturing data and transmitting it over network 102. The DSD 104 may have a direct user interface, or may be connected to and accessed via a host device connected to the DSD 104.

Cloud server 106 may include one or more servers or computer systems that provide remote "cloud" storage and other computing resources, for example over a network 102. Cloud server 106 may include one or more server systems, storage devices, data centers, and other components, which may be co-located or geographically distributed.

Distributed blockchain ledger system 108 may include a plurality of blockchain nodes 112, each independently maintaining a copy of a blockchain ledger made up of a plurality of blockchain entries 116. Blockchain nodes 112 may comprise network-connected servers, personal computers, or other processing devices running software or firmware to implement the distributed blockchain ledger system 108 infrastructure. The distributed nature of the blockchain ledger system 108 among multiple nodes 112 makes the blockchain ledger difficult to tamper with. The blockchain nodes 112 may use a majority system to determine the "correct" blockchain ledger, so that tampering with blockchain entries would require gaining control of a majority of the blockchain nodes 112. The blockchain nodes may be unrelated or unaffiliated computing systems, each running software for the distributed blockchain ledger system 108, or they may be co-owned or co-controlled computing systems. The blockchain nodes 112 may be co-located, or may be geographically distributed.

In addition to the security provided by the redundant and distributed blockchain ledger storage across multiple blockchain nodes 112, the distributed blockchain ledger system 108 also provides security in the way the blockchain ledger itself is implemented. A blockchain ledger may comprise a "chain" of blockchain entries 116. Each blockchain entry 116 may include a block of data 118 storing identifying data for a transaction, file, or other record, and a Smart Contract 120. The Smart Contract 120 may include executable code for performing actions related to the blockchain entry 116, such as providing details from the data block 118, verifying the authenticity of a transaction, granting access or permission for performing a transaction, or other operations. The underlying data for each blockchain entry may be put through a hashing algorithm, encrypted, or otherwise secured or made uniquely identifiable while prohibiting unauthorized access or tampering. The Smart Contract 120 may be incorporated into (and may be hashed or encrypted along with) the data block 118, or may be maintained as a separate part of a blockchain entry 116. The hashing or encryption of a current block may include incorporating data from the previous blockchain entry in the distributed ledger, which previous data may also be put through the hashing or encryption algorithm along with the new data for the current entry. Therefore, tampering with a previous blockchain entry would require altering each entry that was added to the chain after, including decrypting the hashed or encrypted data for each entry, thereby making it computationally unrealistic to modify entries in a blockchain ledger. These features make blockchain ledgers very secure and tamper-resistant, while still allowing access to the underlying data recorded in the ledger blockchain entries 116.

Web application 110 may include an interface used to access information from the distributed blockchain ledger 108, and may be run on or executed by a third party computing system to allow a user to search or verify records in the distributed ledger. A user may be able to enter search criteria or blockchain entry 116 reference ID numbers into the web application 110, which may submit a query over the network 102 to the distributed blockchain ledger 108, and to a blockchain node 112. In response to the query, information may be returned over the network 102 and presented to the user via the web application 110.

In an example embodiment, system 100 may be used to implement blockchain technology in a data storage system, to securely record and validate files 114 stored to a data storage drive 104. When raw files 114 are stored to the DSD 104, exact or modified versions or copies of the files 114 may be transmitted to the cloud server 106 over the network 102. For example, an exact copy of an image file may be uploaded to the cloud server 106, or a scaled down, trimmed, or watermarked version of the file may be transferred. Similarly, in the case of video files, audio files, or text files, all, a portion, or modified copies of the file(s) may be transmitted to the cloud server 106. If a file is modified for storage at the cloud server 106, it may be modified by the DSD 104 prior to transmittal, or by the cloud server 106 after receipt. In some embodiments, any or all files stored to the DSD 104 may be uploaded to the cloud server 106 in this manner. In other embodiments, only files stored to a specific folder, directory, or partition of the DSD 104 may be uploaded, or only files specifically selected by a user may be uploaded.

The cloud server 106 may store the received files 114 to cloud storage. The cloud server 106 may be configured for write-once-only access from the DSD 104, so that files can be stored to the cloud server 106 only once, but not modified once written. In some embodiments, the cloud server 106 may be configured for providing an immutable repository for original data as a means of verifying or supporting blockchain records, and may therefore not be accessed as a traditional cloud storage location from which files can be written, read, and modified freely by a user associated with a cloud storage account. Instead, the files 114 recorded at the cloud server may be published and made accessible by other systems, such as the distributed blockchain ledger 108 and blockchain nodes 112, via a web link or similar network address. The web link may be returned from the cloud server 106 to the DSD 104 in response to receiving the files 114. The link can be used or shared by a user or other operator of the DSD 104 as evidence of when the file was stored and by whom. The link can also be incorporated into a blockchain entry 116.

The DSD 104 may transmit a request to generate a blockchain entry 116 corresponding to a file 114 to the distributed blockchain ledger 108, for example by transmitting the information related to the file 114 over network 102 to a blockchain node 112. The information may include the web link from the cloud server 106, as well as other identifying information or metadata about the files 114, but may not include the raw file 114 itself. For example, the information provided by the DSD 104 may include metadata about where or when the file was created or stored, a file size, file type, and other information about the file. The DSD 104 may be configured to generate a hash of the raw file 114, which may uniquely identify the file 114 without providing the file itself. The DSD 104 may also include pre-set user information, such as an owner or user of the drive that may be associated with the file 114 stored to the DSD 104, and provided to the distributed blockchain ledger system 108. In some embodiments, both the raw file 114 and metadata may be hashed by the DSD 104 before being transmitted to a blockchain node 112.

A blockchain node 112 may receive the information from the DSD 104 and use it to generate a blockchain block 118. For example, the blockchain node 112 may determine a hash value from a last blockchain entry in the ledger, and hash it along with the information received from the DSD 104 for the file 114. The information and hash values may be encrypted, compressed, or otherwise modified, prior to or after the hashing operation, to produce the blockchain block 118. The blockchain node 112 may also add a Smart Contract 120 executable code block to the blockchain entry 116. The Smart Contract 120 may be included with the data that is encrypted, compressed, or hashed (e.g. incorporated into the block 118), or may be kept as a separate data element from the block 118.

The Smart Contract 120 may be provided by the DSD 104 along with the information related to the file 114, or it may be provided by the blockchain node 112. In some embodiments, there may be multiple different Smart Contracts 120 that can be added to a blockchain entry 116, with different Smart Contracts configured to perform different operations depending on the use field or business area for which the file 114 was generated. For example, the file 114 may correspond to medical records, and the DSD 104 may be operated by or associated with a doctor's office or hospital. The associated Smart Contract may ensure access to the file 114 at the Cloud Server 106 complies with laws and regulations regarding the sharing of confidential medical files (e.g. with the Health Insurance Portability and Accountability Act, HIPAA). In another example, the file 114 may correspond to student records, and the DSD 104 may be associated with a university. The Smart Contract 120 may be configured to allow schools or employers to access the file 114 at the Cloud Server 106 to verify the educational history of in individual. Accordingly, the Smart Contract 120 may be provided by the DSD 104, or the distributed blockchain ledger 108 may store a database of different Smart Contracts, with the correct Smart Contract 120 to append to a blockchain record determined by an identifier or selection indicator provided by the DSD 104. The Smart Contract 120 may be configurable or programmable, for example based on user selections, field of use, and selected requirements and agreements (e.g. to govern access or usage rights). The configuration or programming may be performed by the manufacturer or distributor of the DSD 104, by a third party, or by a user of the DSD 104. For example, a user may enter information during a first-time setup of the DSD 104 that can be used to generate a Smart Contract 120 associated with the DSD 104 based on the owner or field of use information provided by the user. The Smart Contract 120 may be generated by the DSD 104 based on the information, or an indication of the information may be set to the blockchain node 112 where the Smart Contract 120 may be generated or selected based on the indication.

Once the blockchain entry 116 is generated by a blockchain node 112, the blockchain entry may be distributed to the other blockchain nodes 112 in the distributed blockchain ledger system 108. Each node 112 may update a respective blockchain ledger maintained by the node with the blockchain entry 116. In some embodiments, rather than generating the blockchain entry 116 at one node 112 and distributing it to other nodes, the information regarding the file 114 may be provided from the DSD 104 to each blockchain node 112, and each node may generate (e.g. through hashing, encrypting, etc) a blockchain entry 116 independently, which entry should still be consistent among all the nodes 112. A reference identifier or number for the blockchain entry 116 may be provided from the blockchain node 112 back to the data storage device 104, from which it may be accessed by an associated user or operator of the DSD 104. The reference number may then be shared, so that the blockchain entry may be accessed to verify the information stored therein. An example device which may be used to implement the blockchain system 100 of FIG. 1 is described in regard to FIG. 2.

Figure 2:
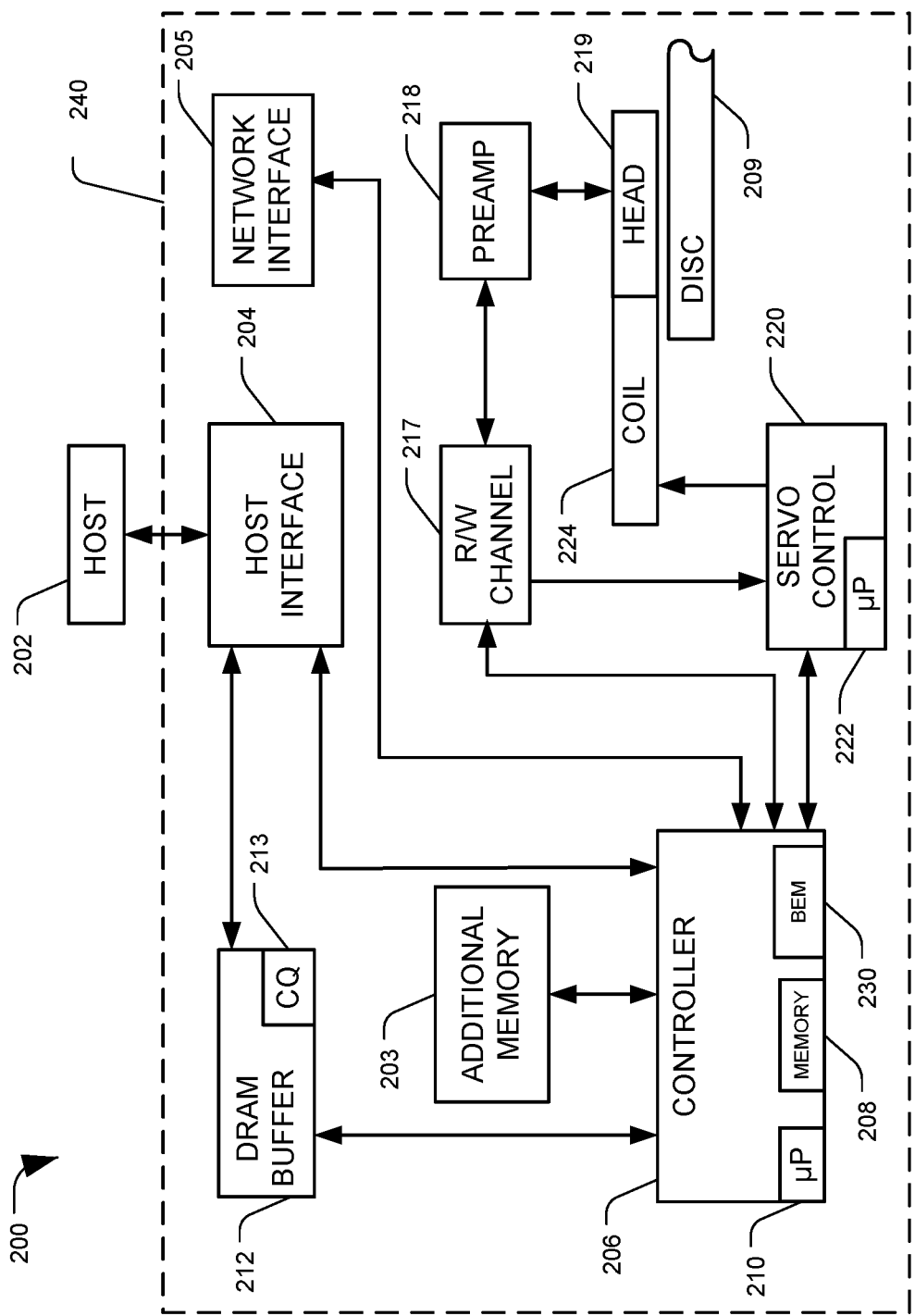
FIG. 2 is a diagram of a system configured to implement blockchain technology in a data storage system, in accordance with certain embodiments of the present disclosure.

FIG. 2 is a diagram of a system 200 configured to implement blockchain technology in a data storage system, in accordance with certain embodiments of the present disclosure. Specifically, FIG. 2 provides a functional block diagram of an example computing device 200, which may be an example of the DSD 104, cloud server 106, blockchain node 112, or a computing system implementing web interface 110 of FIG. 1. For the examples provided herein, computing device 200 may be referred to as data storage device (DSD) 200. The DSD 200 may comprise a hard disc drive (HDD), solid state drive (SSD), or hybrid drive according to some embodiments.

The DSD 200 can communicate with a host device 202 via a hardware or firmware-based interface circuit 204, or via a wireless or wired network interface 205. The host 202 may comprise a computer such as a desktop or laptop, a RAID (redundant array of independent drives or discs) or server controller, or some other device that can exchange commands and data with the DSD 200.

Then host interface 204 may comprise any interface that allows communication between a host 202 and a DSD 200, either wired or wireless, such as USB (universal serial bus), IEEE (Institute of Electrical and Electronics Engineers standard) 1394, Compact Flash, SATA (Serial AT Attachment), eSATA (External SATA), PATA (Parallel AT Attachment), SCSI (Small Computer System Interface), SAS (Serial Attached SCSI), PCIe (Peripheral Component Interconnect Express), Fibre Channel, Ethernet, or Thunderbolt, among others. The host interface 204 may include a connector that allows the DSD 200 to be physically removed from the host 202. The DSD 200 may have a casing 240 housing the components of the DSD 200.

The network interface 205 may be used to communicate over a network (e.g. network 102 of FIG. 1), and may be any of the above-listed communication protocols. The DSD 200 may connect to a network directly (e.g. via cellular connection), or via a modem or router, or through host 202.

The buffer 212 can temporarily store data during read and write operations, and can include a command queue (CQ) 213 where multiple operations can be temporarily stored pending execution. Commands arriving over the interfaces 204 or 205 may automatically be received in the CQ 213 or may be stored there by controller 206 or another component.

The DSD 200 can include a programmable controller 206, which can include associated memory 208 and processor 210. The controller may execute firmware (FW) (e.g. instructions stored to a memory, such as additional memory 203) to control the operations of the DSD 200. The controller 206 may control data access operations, such as reads and writes, to one or more memories, such as disc memory 209, additional memory 203, or any combination thereof. For example, additional memory 203 may include volatile memory such as dynamic random access memory (DRAM) or static RAM (SRAM), nonvolatile solid state memory such as NAND flash memory, read-only memory (ROM), or other memory types. The additional memory 203 can function as a working memory for storing temporary data, a cache to store recently or frequently read or written data, or data likely to be read soon, or for other temporary data storage. Additional memory 203 may also function as main long-term storage instead of or in addition to disc(s) 209. A DSD 200 containing multiple types of nonvolatile storage mediums, such as a disc(s) and flash, may be referred to as a hybrid storage device or drive. The memory 208 may similarly include DRAM, SRAM, or similar volatile memory, and may store FW instructions during device operation, cached data, or other information.

The DSD 200 can include a read-write (R/W) channel 217, which can encode data during write operations and reconstruct user data retrieved from a memory, such as disc(s) 209, during read operations. A preamplifier circuit (preamp) 218 can apply write currents and read bias to the head(s) 219, and provides pre-amplification of read-back signals. Head assembly 219 may include a read head element and a write head element, and may include a slider on which the read and write elements may be mounted. A servo control circuit 220 may use servo data to provide the appropriate current to the coil 224, sometimes called a voice coil motor (VCM), to position the head(s) 219 over a desired area of the disc(s) 209 by moving an adjustable actuator arm on which the head(s) 219 are mounted. The controller 206 can communicate with a processor 222 of the servo controller 220 to move the head(s) 219 to the desired locations on the disc(s) 209 during execution of various pending commands in the command queue 213.

The DSD 200 may include a blockchain engine module (BEM) 230. The BEM 230 may be a processor, controller, or other circuit, or it may be a set of software instructions that, when executed by a processing device, perform the functions of the BEM 230, or a combination thereof. In some embodiments, the BEM 230 may be part of or executed by the controller 206, incorporated into other elements of the DSD 200, a standalone component within the DSD 200, or any combination thereof. The BEM 230 may control operations of DSD 200 relating to implementing blockchain technology for files stored to or managed by the DSD 200.

An embodiment in which DSD 200 is a storage drive, such as storage device 104 of FIG. 1, to which files 114 are originally stored for incorporation into a blockchain ledger. The BEM 230 may determine files to which to apply blockchain technology solutions. All files stored to the DSD 200 may be selected for blockchain incorporation, or a subset of files. For example, a selected folder in the file system, logical or physical storage partition, or logical block address (LBA) range may be designated as blockchain-secured storage. The BEM 230 may monitor the selected storage locations for any files stored to those locations, and may perform blockchain operations to those files. In other embodiments, a user may select files to add to a blockchain, either before the files are received from the host 202 or after they have been stored to the DSD 200. For example, commands received from the host 202 may include a flag or other identifier that indicates an incoming or already-stored file should be added to a blockchain, and the BEM 230 may monitor incoming commands for the flag or identifier. In another example, a user may use a file system interface to highlight or select stored files, folders, directories, or partitions for incorporation into a blockchain, which selection may be provided to the BEM 230.

Once a file has been identified for incorporation into a blockchain, the BEM 230 may transmit a copy of the file to a cloud server, such as cloud server 106 of FIG. 1. The file may be transmitted via the host 202 through host interface 204, or via a network directly through network interface 205. A network address for the cloud server may be pre-loaded to DSD 200 for use when transmitting the file, for example if the cloud server is operated by or associated with a manufacturer of the DSD 200. A user or operator of the DSD 200 may also designate or specify a destination cloud server or address; for example, a cloud server associated with a blockchain service selected by the user or operator.

The BEM 230 may transmit a raw file to the cloud server in its original form, or the BEM 230 may modify the file prior to transmission. For example, the BEM 230 may encrypt the file, or may trim, reduce, or otherwise alter the file prior to transmission. In one example, a watermark may be added to the file, with identifying information relating to the creator of the file or to the DSD 200. A watermark or other alterations may discourage unauthorized sharing or distribution of the copy of the file uploaded to the cloud server.

In response to sending the file to the cloud server, the BEM 230 may receive a network or web link to the copy of the file at the cloud server. The link may be received via the host interface 204 or network interface 205. The link may be received along with an identifier corresponding to the file or the message from the DSD 200 that contained the file, so the proper link can be associated with the proper file at the DSD 200. The BEM 230 may incorporate the link into metadata associated with the file at the DSD 200. For example, the link may be displayed along with the file in a file system user interface (UI) when accessing the DSD 200, or if a user requests "properties" for the file. The web link may also be transmitted from the DSD 200 to a user or operator of the DSD 200, for example via a command or message sent to the host 202 via host interface, or by sending a text message, email, or other communication via a contact method set up by a user or operator of the DSD 200. In some examples, the contact method may be provided to the cloud server along with the file, and the cloud server may send the message with the web link to the user or operator of the DSD 200.

After obtaining the web link to the file, the BEM 230 may generate or gather information or metadata associated with the file to send to a blockchain node, such as blockchain node 112 of FIG. 1. The metadata that the BEM 230 gathers to send to the blockchain node may include the web link, and details about the file itself, such as creation or modification date and time, file size, file owner or creator, device on which the file was created, location of file creation or of the DSD 200, or other file information. The BEM 230 may also be configured to generate a hash of the raw file itself, a hash of some or all of the metadata, or a combination thereof. The metadata may also include pre-set information set by a user or operator of the DSD 200, such as data set during setup of the DSD 200 and prior to storage or creation of the file. Example pre-set data may include identifying information for the user or operator, such as name, location, time zone, associated business entity, or other information. The metadata may also identify a field or purpose of the file, which may be used to determine a Smart Contract to associate with the file in the blockchain. For example, the file may be identified as or associated with medical records, work history, education history, business trade secrets, intellectual property generation or attribution documents, personal document storage, or other fields or purposes. This information may be used by a blockchain node to select a Smart Contract to add. In another example, the BEM 230 may include a Smart Contract as part of the metadata.

The BEM 230 may transmit the gathered file information to a blockchain node, e.g. via host interface 204 or network interface 205. Once again, a destination address for the transmission may be pre-configured to the DSD 200, or may be set or selected by a user or operator. The BEM 230 may transmit a command or request to generate a blockchain entry for the file along with the file information. In order to keep the blockchain entry small, and therefore keep the blockchain as a whole easier to manage and distribute among blockchain nodes, the BEM 230 may not send the raw file itself. Instead, the BEM 230 may only send a smaller amount of file-related information, metadata, and the link to the file at the cloud server.

After transmitting the file information to the blockchain node, the BEM 230 may receive a reference number or identifier from the blockchain node. The reference number or identifier may be used to access the blockchain entry for the file within a distributed blockchain ledger system. Similar to the web link for the cloud server, the identifier for the blockchain entry may be added to metadata associated with the file by the BEM 230, and accessible through a file system UI, or the identifier may be sent or transmitted to a user or operator of the DSD 200.

In another embodiment, rather than representing storage device 104 of FIG. 1, DSD 200 may represent a cloud server 106, or the combination of DSD 200 and host 202 may correspond to a cloud server. For example, DSD 200 may represent a server system, where controller 206, interfaces, and related components may correspond to a RAID or server controller that controls a plurality of data storage devices, and the disc 209, additional memory 203, and related elements may represent storage systems controlled by the server controller. Accordingly, a cloud server of this example may include multiple separate devices that are represented together as DSD 200 for convenience. In another example, the DSD 200 may be one of a plurality of storage devices in a server system, and host 202 may be a network-attached server controller or RAID controller.

Cloud server DSD 200 may be configured to receive a file from a storage device, such as data storage device 104 of FIG. 1. The file may be received via host 202 and host interface 204, or via network interface 205. The DSD 200 may be configured to store the file to a memory (e.g. disc 209), and may prevent the file from being modified once written, to create a record of an original file that cannot be tampered with. As further security, the file may be encrypted or otherwise protected to prevent modification.

In some examples, the file received from the storage device may be stored in an unmodified state from how it was received. In other examples, the BEM 230 may compress the file, or trim, shorten, or otherwise modify the file (e.g. to insert a watermark or other distinguishing feature, or to prevent access to the entirety of an unmodified file). The BEM 230 may publish the file to enable network access, e.g. by automatically generating a web link which can be used to access the stored file via a network. The BEM 230 may return the web link to a device which initially sent the file for storage, or the BEM 230 may provide the web link to an address or contact included in the command to store the file (e.g. by texting the link to a phone number or sending it to an email address).

Subsequently, the cloud server DSD 200 may receive requests to access the stored file via the web link. The BEM 230 may verify that the request is authorized or authentic, for example based on symmetric or asymmetric cryptography of the access request, based on a password or other authorization identifier, or by other methods. Restricting access may allow an authorized blockchain ledger system to access the file, while prevent general public access (e.g. to prevent unauthorized distribution of a copyrighted or otherwise protected file). In other embodiments, files stored at the cloud server DSD 200 may be accessible by any system with the web link. Once an authorized request has been received, the BEM 230 may allow the requesting system to access the stored file.

In yet another embodiment, DSD 200 may represent a blockchain node device, such as blockchain node 112 of FIG. 1. As with a cloud server DSD described above, the blockchain node DSD 200 may comprise one or more controlling devices connected to one or more storage devices, a unified device including both controllers and memories, or any number of configurations. The blockchain node DSD 200 may be in communication, via host interface 204 and host 202 or via network interface 205, to a network (e.g. network 102 of FIG. 1) and a plurality of other blockchain nodes (e.g. blockchain nodes 112 of distributed blockchain ledger system 108 of FIG. 1).

The blockchain node DSD 200, for example via the BEM 230, may be configured to receive a request, command, or data transmission from a storage device directing the blockchain node DSD 200 to generate a blockchain entry for a file. The request may include information about the file, such as a hash of the file, a web link to access the file from a cloud server, and metadata about the file, its creation, and its creator or owner. In some examples, the request may also include a Smart Contract to be included with the blockchain entry.

The blockchain node DSD 200 may generate a blockchain block, for example by hashing some or all of the data received from the storage device along with a hash from a previous blockchain entry. The blockchain node DSD 200 may add a Smart Contract to the blockchain entry, which Smart Contract may be hashed along with the other data, or maintained separately. As indicated above, the Smart Contract may be received along with the file information, or it may be provided by the blockchain node DSD 200, for example by retrieving a Smart Contract from a database of Smart Contracts based on an identifier received from the device transmitting the blockchain generation request.

The blockchain node DSD 200 may transmit the blockchain entry to other blockchain nodes in a distributed blockchain ledger system, which may each add the blockchain entry to the end of a respective independently maintained copy of the blockchain ledger. In another example, the file information may be distributed to other blockchain nodes, and each blockchain node may independently generate the blockchain entry.

The blockchain node DSD 200 may provide an identifier or reference number for the blockchain entry in response to receiving the request to generate the blockchain entry. The identifier may be based on a hash generated for the blockchain entry, may correspond to the blockchain entry's position on the blockchain ledger, or may be generated according to another process. The identifier may be returned to the device that issued the request, or it may be transmitted to another contact destination, such as an email address or phone number identified in the request or associated with an account attached to the requesting device (e.g. in a database of customers of a blockchain service).

The blockchain node DSD 200 may also respond to requests to access blockchain entries, for example using the BEM 230. The blockchain node DSD 200 may receive a request, such as from a web application accessed by a third party, to access a blockchain entry or retrieve details related to a file. The request may include an identifier corresponding to a blockchain entry, such as the identifier generated by the blockchain node(s) when the blockchain entry was generated.

The blockchain node DSD 200 may use the identifier to locate and access the requested blockchain entry in the blockchain ledger. After the blockchain entry has been accessed, the BEM 230 may access and implement the Smart Contract associated with or included in the blockchain entry. The Smart Contract may control access to the information in the blockchain entry. The Smart Contract may also include instructions to use the web link included in the blockchain entry to retrieve the copy of the file stored to the cloud server. Some or all metadata of the blockchain entry, and the copy of the file from the cloud server, may be provided to the web application in response to receiving the request. Optionally, the retrieval and return of blockchain data, cloud server files, or both can be performed without using a Smart Contract, by using general purpose access protocols or code executing on the blockchain node DSD 200.

In some examples, the blockchain node DSD 200 may also perform conflict resolution between files or blockchain entries, for example by comparing details between files or entries. In addition to the identification number for a first blockchain entry, the web application may also provide the blockchain node DSD 200 with details of another file, or an identifier for a second blockchain entry in the blockchain ledger. The BEM 230, for example using the Smart Contract(s) for the file(s), may compare details of both files, and perform conflict resolution. Conflict resolution may include identifying and highlighting differences between two or more files, and the type of conflict resolution performed may be defined or specified during Smart Contract 120 selection or creation, such as based on information specified by a user during setup of the DSD 104 or a blockchain account. For example, conflict resolution may include identifying which file was created or added to the blockchain ledger earlier, based on file metadata or block numbers in the block chain. In other examples, conflict resolution may include identifying differences in file size, differences in owners or originators of the files, or differences between the raw files themselves that may indicate that one file was a modification of the other. These conflict resolution details may be provided to the web application in response to the queries regarding the files or blockchain entries. The processes described herein regarding a DSD 200, cloud server DSD 200, or blockchain node DSD 200 are further described in regard to FIG. 3.

Figure 3:
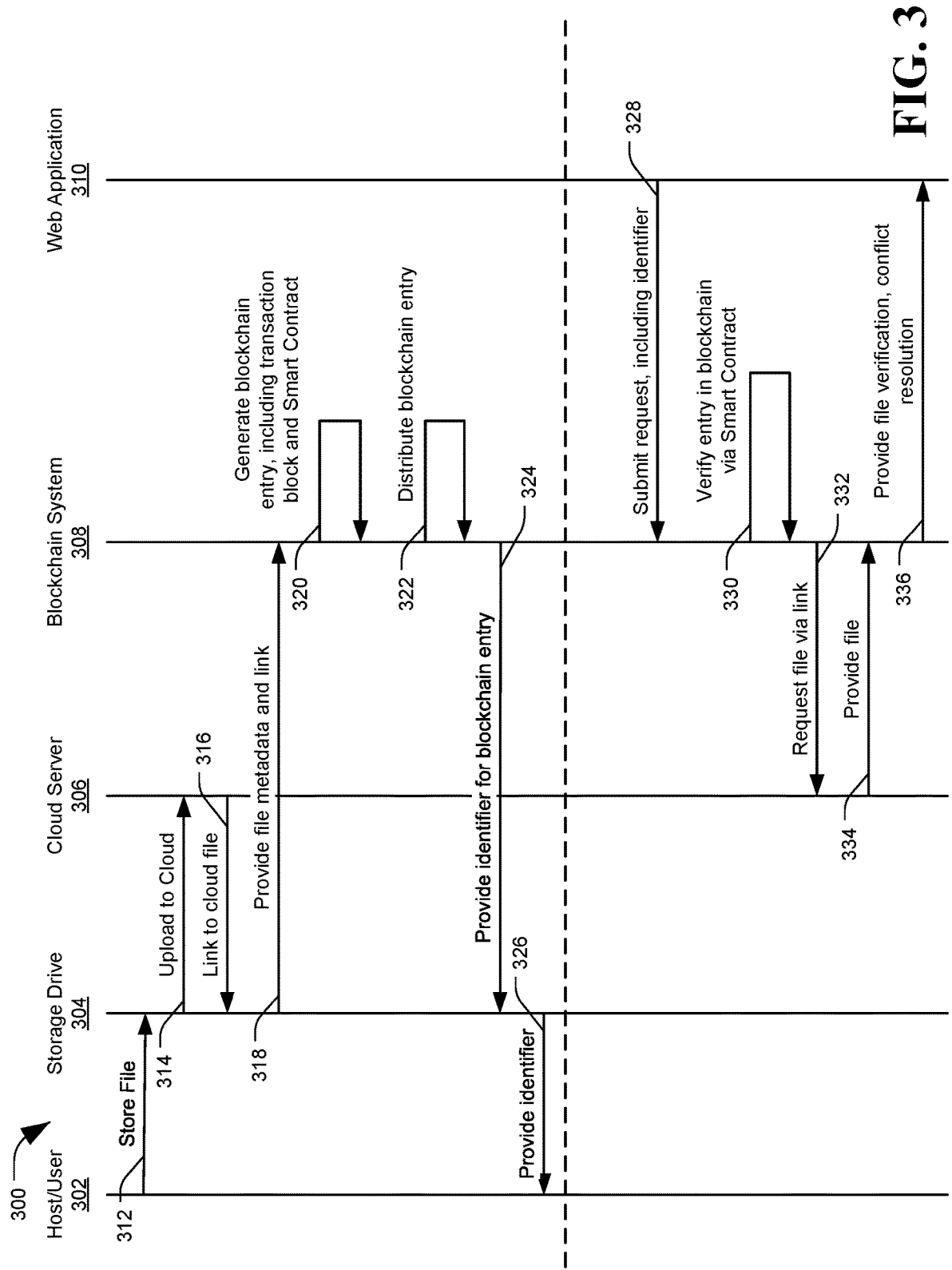
FIG. 3 is a process flow diagram of a system configured to implement blockchain technology in a data storage system, in accordance with certain embodiments of the present disclosure.

FIG. 3 is a process flow diagram 300 of a system configured to implement blockchain technology in a data storage system, in accordance with certain embodiments of the present disclosure. In particular, FIG. 3 depicts operations performed by and between elements of the system 100 of FIG. 1. The process flow diagram 300 includes a host or user 302, a storage drive or DSD 304, a cloud server 306, a blockchain system (e.g. one or more blockchain nodes) 308, and a web application 310. Communications between various device components may be made via one or more networks, such as network 102 of FIG. 1.

Host or user 302 may be an operator or controller of storage drive 304. For example, storage drive 304 may be a network-attached storage (NAS) drive owned by an individual or an organization. The host or user 302 may store a file to the storage drive 304, via process 312. The file may be stored to a special folder, directory, or partition of the storage drive 304 configured to add files to a blockchain ledger. Alternately, the user or host 302 may select the file to add to a blockchain (e.g. via a right-click operation in a file system UI), or all files added to the storage drive 304 may be automatically added to a blockchain.

Once a file has been stored and selected for incorporation into a blockchain, the storage drive 304 may upload an unmodified or modified copy of the file to cloud storage at a cloud server 306, via process 314. The cloud server 306 may store and publish the copy of the file, and return a link to the published copy of the file to the storage drive 304, via process 316.

After receiving the web link, the storage drive 304 may gather or generate metadata related to the file, including the link, and provide it to a blockchain system 308, via process 318. The metadata may include details on the file itself (file type, size, etc.), origination details (when the file was created, by whom, where, etc.), a hash of the file itself, a Smart Contract to include with the file in the blockchain entry, a destination or contact type to which a reference identifier for the blockchain entry should be sent, or other information.

The blockchain system 308 may receive, from the storage drive 304, the information associated with the file along with a request to generate a blockchain entry. In response the blockchain system 308 may generate a new blockchain entry, which may include generating a blockchain "block" for the file incorporating some or all of the received file information, and a Smart Contract, via process 320. The block may be hashed, potentially along with information (such as another hash value) from a prior or last entry in the blockchain ledger. The Smart Contract may be provided by the storage drive 304 or generated or retrieved by the blockchain system 308. The blockchain entry may be distributed to each blockchain node in the blockchain system 308, either by distribution after generating the entry, or by distributing the underlying file information so that each node may generate its own blockchain entry, via process 322. The blockchain nodes in the blockchain system 308 may compare blockchain entries or blockchain ledgers using a majority system, where if a majority of the nodes have an identical blockchain entry or ledger, that version replaces any divergent entries or ledgers in other nodes. After distributing the blockchain entry across the blockchain system 308, the system 308 may provide an identifier for the blockchain entry to the storage drive 304, via process 324, or to an alternate contact destination. For example, the storage drive 304, or the blockchain system 308, may provide the identifier to the host or user 302 that initiated the file save and blockchain operation, via process 326.

The blockchain system 308 may receive a request to access a blockchain entry, using a blockchain entry identifier, from a web application 310, via process 328. Using the identifier, the blockchain system 308 may access the blockchain entry, and may implement the Smart Contract for the blockchain entry to verify or retrieve details from the blockchain entry, via process 330. The blockchain system 308 (e.g. via the Smart Contract using the web link from the blockchain entry) may issue a request to the cloud server 306 to retrieve the copy of the file associated with the blockchain entry, via process 332. The cloud server 306 may provide the file to the blockchain system 308, via process 334. The blockchain system 308 may then respond to the query from the web application 310 by providing details regarding the file for the blockchain entry, verifying the authenticity of the file, displaying the copy of the file retrieved from the cloud server 306, or otherwise respond to the web application 310 query, via process 336. In some examples, the blockchain system 308 or Smart Contract may be further configured to perform conflict resolution by comparing two or more files, including their metadata or other distinguishing features.

Figure 4:
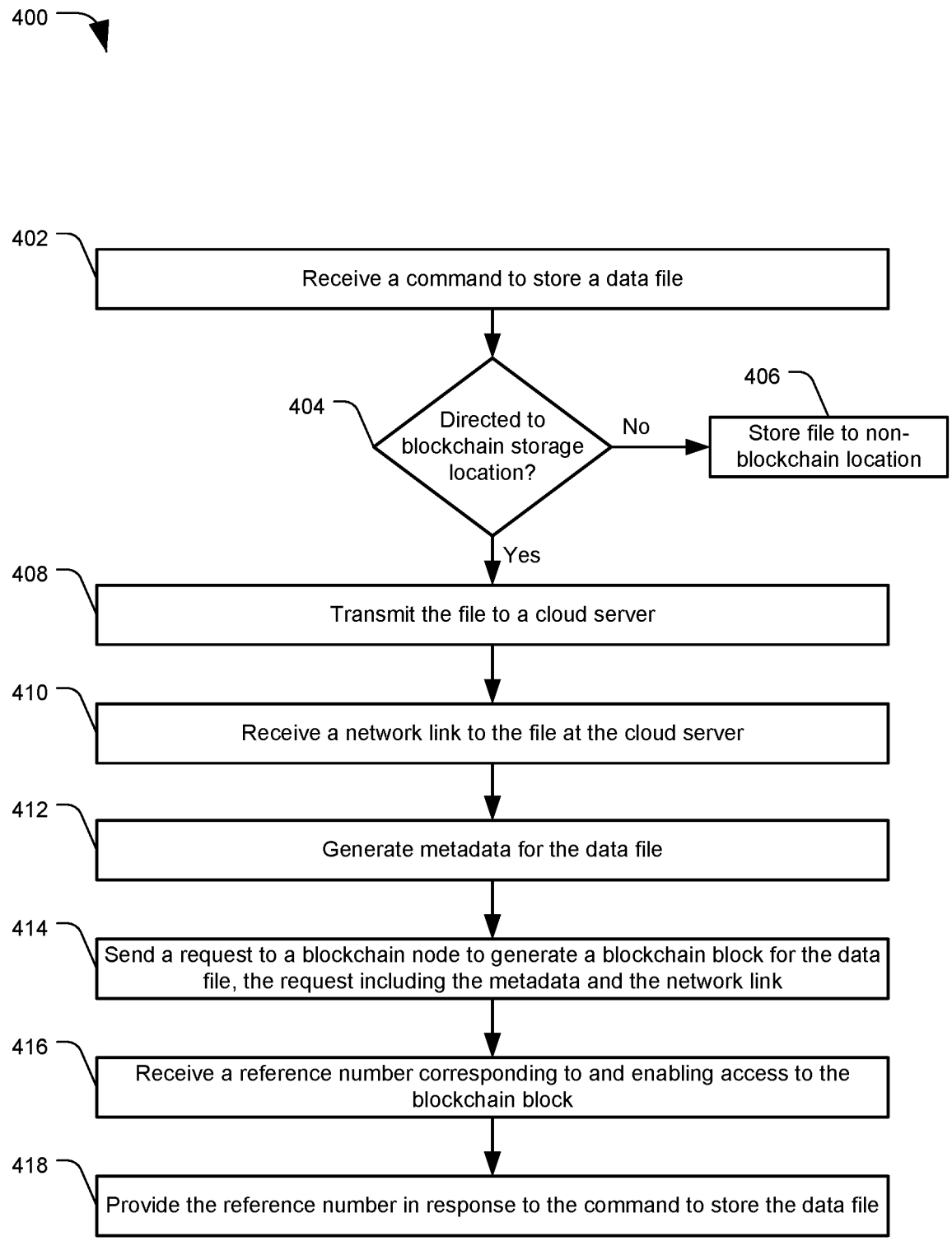
FIG. 4 depicts a flowchart of an example method of implementing blockchain technology in a data storage system, in accordance with certain embodiments of the present disclosure.

Turning now to FIG. 4, a flowchart of an example method 400 of implementing blockchain technology in a data storage system is shown, in accordance with certain embodiments of the present disclosure. Method 400 may be performed by a data storage device, for example DSD 200 using controller 206 and blockchain engine module (BEM) 230 of FIG. 2. Method 400 may include an example process performed by a DSD to generate a blockchain entry for a file stored to the DSD.

The method 400 may include receiving a command to store a data file at a DSD, at 402. The command may be received from a host or controller device connected to the DSD, via a network connection, from a user via a user interface of the DSD, or otherwise received. The command may identify a storage location of the DSD where the file should be stored. A determination may be made, at 404, whether the destination is a blockchain storage location. Certain storage locations may be configured to automatically generate blockchain entries for files stored to those locations. If the storage destination is not a blockchain storage location, the method 400 may include storing the file to the designated non-blockchain location, and the method may end, at 406.

If the storage location is determined to be a blockchain location, the method 400 may include transmitting the file to a cloud server, at 408. The destination address for the cloud server may be pre-configured into the DSD, or it may be selected or added by a user or operator of the DSD. The DSD may send a copy of the original raw file, or the file may be modified, compressed, or otherwise altered prior to transmission to the cloud server. In some examples, the file may only be stored at the cloud server, and no local copy of the file may be stored to a storage medium of the DSD.

Based on providing the file to the cloud server, the DSD may receive a network link to the file at the cloud server, at 410. The DSD may generate or gather metadata related to the file, including the network link, into a data package to be sent to a blockchain system, at 412. Generating the metadata may include generating a hash value from the original file or the copy uploaded to the cloud server. The metadata may also include details about the file itself, user or owner details pre-set at the DSD prior to storing the file, a Smart Contract to incorporate into the blockchain entry, a destination or contact details to which a blockchain entry identifier should be sent, an identifier of the DSD, owner, or organization initiating the blockchain request, or other details.

At 414, the method 400 may include sending a request to a blockchain node to generate a blockchain block for the data file, with the request including the metadata and the network link. The method 400 may include receiving a reference number corresponding to and enabling access to the blockchain block, at 416. At 418, the method 400 may include providing the received reference number in response to the original command to store the data file at block 402. In some embodiments, the reference number may be transmitted or displayed to a host or user that initiated the file storing command. In other examples, the reference number may be added to metadata associated with the stored file, so that the reference number may be obtained by viewing file properties, for example through a file system user interface. Another method for implementing blockchain technology in a data storage system is described in regard to FIG. 5.

Figure 5:
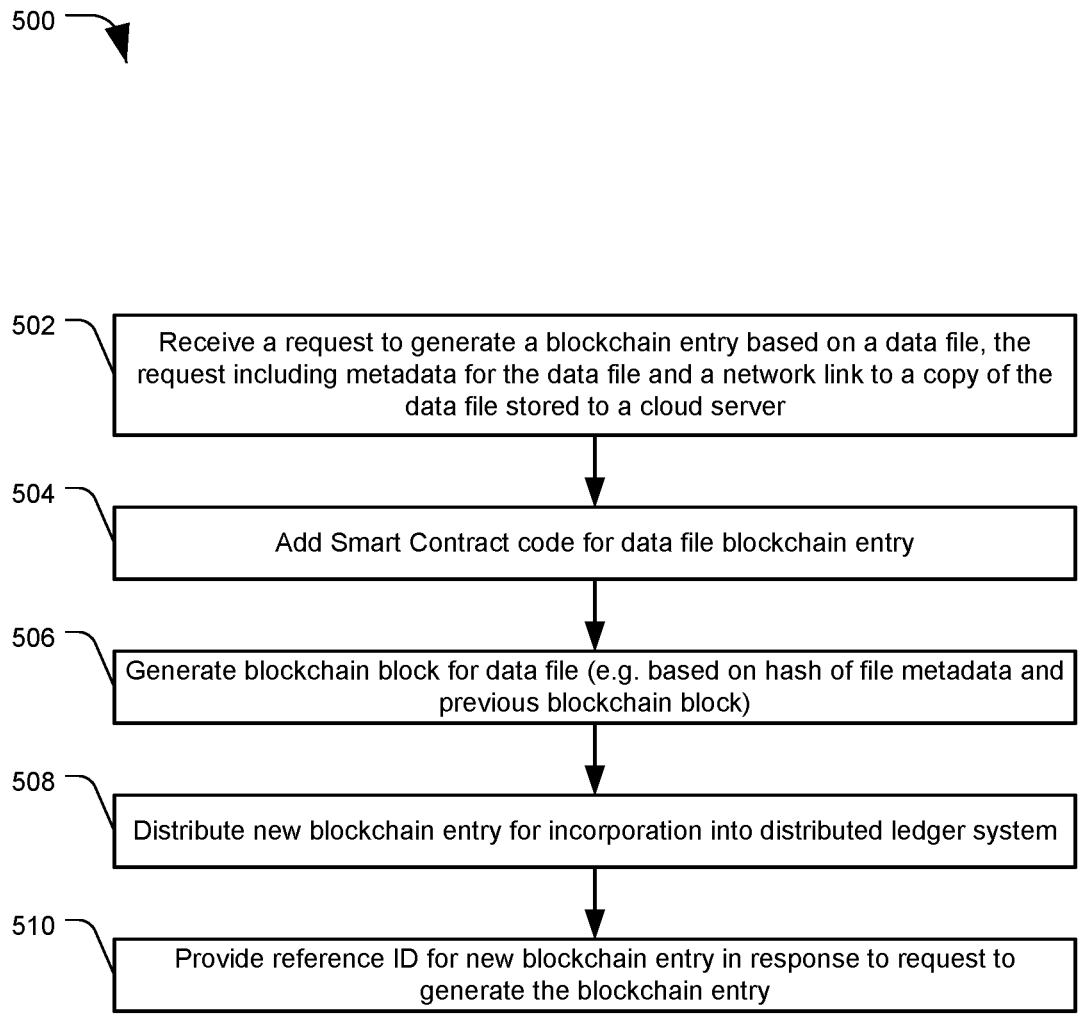
FIG. 5 depicts a flowchart of an example method of implementing blockchain technology in a data storage system, in accordance with certain embodiments of the present disclosure.

FIG. 5 depicts a flowchart of an example method 500 of implementing blockchain technology in a data storage system, in accordance with certain embodiments of the present disclosure. Method 500 may be performed by one or more blockchain nodes in a distributed blockchain ledger system, such as blockchain node 112 of FIG. 1. The method 500 may be performed by a blockchain engine module (BEM) of a blockchain node, as described in regard to FIG. 2. In particular, method 500 may include a process for generating a blockchain ledger entry based on file information received from a storage device.

The method 500 may include receiving a request to generate a blockchain entry based on a data file, the request including metadata for the data file and a network link to a copy of the data file stored to a cloud server, at 502. The data file itself may not be provided to the blockchain node. In response to the request, the method 500 may include adding a Smart Contract block of executable code to the blockchain entry, at 504. The Smart Contract may be added to the file information received with the request to be made into the blockchain block, or it may be kept as part of the blockchain entry without being incorporated into the block itself (see, e.g. blockchain block 118 and Smart Contract 120 as separate elements of blockchain entry 116 of FIG. 1). A reference number or other identifier, which may be used to identify or access the specific blockchain entry, may also be generated as part of the process of generating the blockchain block or blockchain entry. For example, the reference ID may correspond to the hash value generated for the entry, or derived from the hash value.

At 506, the method 500 may include generating the blockchain block for the data file, for example based on running the file metadata and a hash or identifier of a last block of the blockchain ledger through a hash algorithm, to generate a new hash of the current block. In some examples, multiple levels of hashing operations may be employed. A file level hash may be performed on a collection of encrypted metadata, such as file type, creation date, file owner information, the file link from the cloud server, etc. The file level hash may encapsulate the file information and properties and ensure that no changes are made to the file properties. A block level hash may also be performed, which may include a block hash from the previous block in the blockchain, as well as the file level hash result, to generate a block in the blockchain.

At 508, the new blockchain entry may then be distributed to other blockchain nodes for incorporation into respective copies of the distributed blockchain ledger maintained by each node. Alternately, the underlying file information may be distributed to the nodes, and each mode may independently generate a new blockchain using the file information.

The reference ID value for the blockchain entry may be returned or provided in response to the request to generate the blockchain entry, at 510. For example, if the request is received from a data storage device (DSD), the reference ID may be returned to the DSD as part of a success response to the request. Alternately or in addition, the reference ID may be sent to an email address, texted or otherwise messaged to a phone number, or added to an online account associated with the DSD. A method of accessing the blockchain entry based on the reference number is discussed in regard to FIG. 6.

Figure 6:
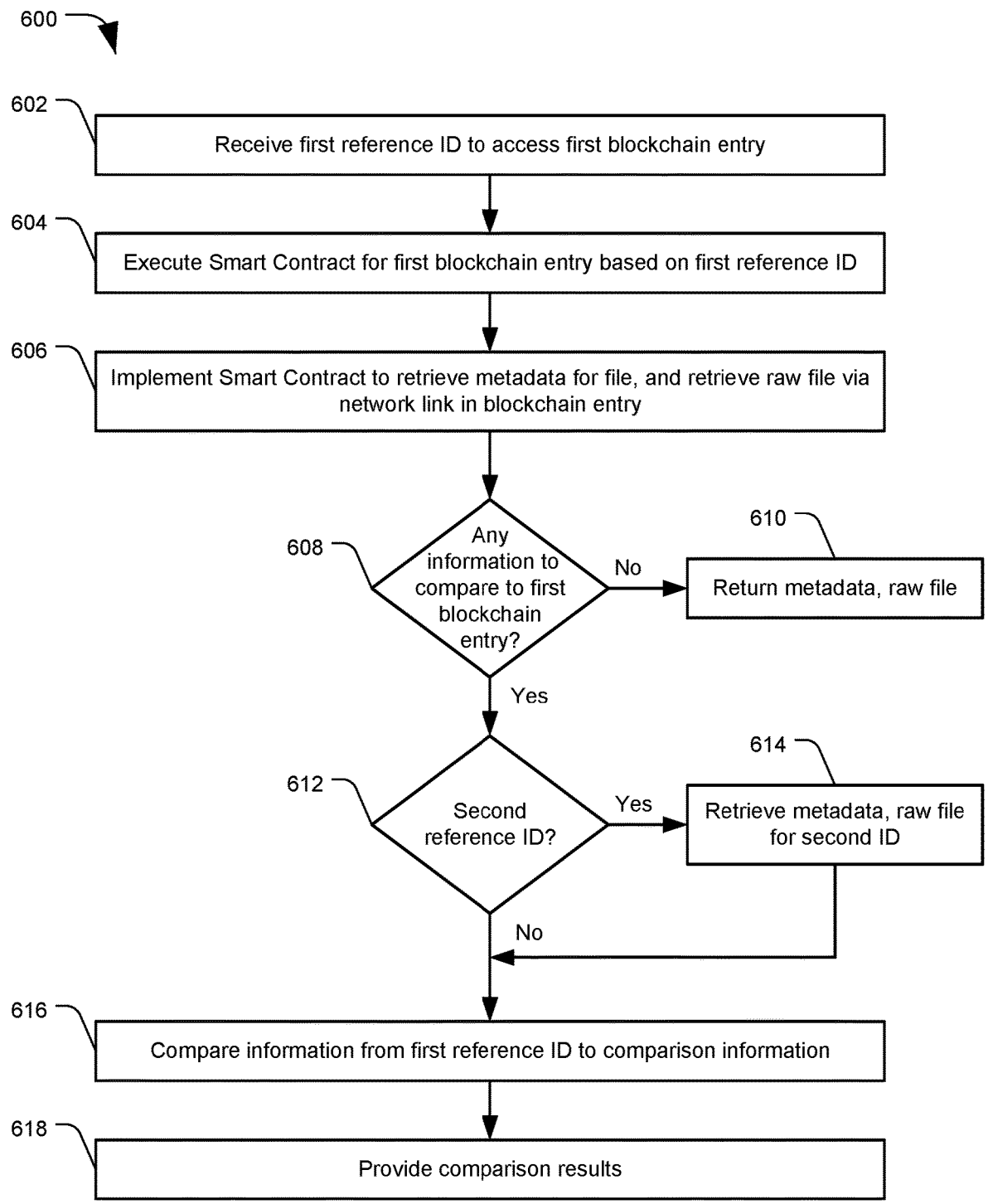
FIG. 6 depicts a flowchart of an example method of implementing blockchain technology in a data storage system, in accordance with certain embodiments of the present disclosure.

FIG. 6 depicts a flowchart of an example method 600 of implementing blockchain technology in a data storage system, in accordance with certain embodiments of the present disclosure. Method 600 may be performed by a blockchain engine module (BEM) in a blockchain node in a distributed blockchain ledger system, such as blockchain node 112 of FIG. 1. In some examples, the method 600 may be performed by multiple BEMs on multiple blockchain nodes. In particular, method 600 may include a process for accessing a blockchain ledger entry based on a request.

At 602, the method 600 may include receiving a reference ID to access a first blockchain entry. The request may be received over a network from a web application accessed by a third party. Based on the reference ID, the method 600 may include accessing the corresponding blockchain entry, and may include executing a Smart Contract of that blockchain entry, at 604. The Smart Contract may be configured to control how the data of the blockchain entry may be accessed and shared, may retrieve data corresponding to the blockchain entry and its associated data file, and may perform conflict resolutions between the file of the blockchain entry and other files.

At 606, the method 600 may include implementing the Smart Contract to retrieve metadata for the file associated with the blockchain entry, and to retrieve the copy of the raw file using a network link to a cloud server included in the blockchain entry. A determination may be made, at 608, whether any information on another file has been presented, for comparison to the first blockchain entry. If not, some or all of the information for the first blockchain entry may be returned in response to the access request, at 610, for example by sending it to the web application for display to the third party.

If a determination is made that information on another file has been presented, at 608, a determination may be made whether the information on another file was received in the form of a second reference ID for a second blockchain entry, at 612. For example, the third party may have entered two reference IDs into the web application, with a request to compare the results. If a second reference ID was received, the method 600 may include using the second reference ID (and potentially the Smart Contract associated with the second blockchain entry) to retrieve the metadata, cloud server file copy, and other information for the second reference ID, at 614.

If no second reference ID was provided (e.g. if the web application sent details of a second file directly, rather than by using a reference ID), at 612, or once the second blockchain entry data has been retrieved, at 614, the method 600 may include comparing the information for the first reference ID to the comparison information, at 616. This may be implemented as a form of conflict resolution, to identify differences between files. For example, the method 600 may include comparing creation dates, creation locations, owner information, file size, differences in hash values, changes in a file itself, or other comparisons. For example, an image comparison algorithm may be employed to identify differences between two similar image files, or text comparison algorithms may be used to identify overlap or differences between text documents. The results of the comparison or conflict resolution analysis may be provided, at 618. For example, a response may be sent to the web application that highlights or displays differences between the first blockchain entry file and the comparison information for a second file.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Steps depicted in the flowcharts may optionally be excluded, added, performed in a different order, or performed with different degrees of concurrency than shown (e.g. steps depicted as sequential may be performed concurrently). Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A method comprising:
receiving, at a data storage device, a data file to store;
transmitting, from the data storage device to a cloud server, the data file;
receiving, at the data storage device from the cloud server in response to transmitting the data file, a network link to access the data file at the cloud server;
sending, from the data storage device to a blockchain node in a network, a request to generate a blockchain block corresponding to the data file, the request including the network link;
receiving, at the data storage device from the blockchain node, a reference number corresponding to the blockchain block, the reference number enabling access to the blockchain block; and
providing the reference number from the data storage device in response to receiving the data file to store.

2. The method of claim 1 further comprising:
generating, at the data storage device, a hash of the data file; and
sending the hash from the data storage device to the blockchain node for incorporation into the blockchain block.

3. The method of claim 1 further comprising:
generating, at the data storage device, metadata for the data file, including information identifying creation details of the data file; and
sending the metadata from the data storage device to the blockchain node for incorporation into the blockchain block.

4. The method of claim 3 further comprising:
the metadata includes pre-set user information identifying a creator of the data file, the user information stored to the data storage device prior to creation of the data file.

5. The method of claim 1 further comprising:
maintaining, at the data storage device, a dedicated storage location;
based on the data file being stored to the dedicated storage location, automatically performing, at the data storage device:
transmitting the data file to the cloud server; and
sending the request to generate the blockchain block corresponding to the data file to the blockchain node.

6. The method of claim 1 further comprising:
receiving, at the blockchain node from the data storage device, the request to generate the blockchain block;
adding, at the blockchain node, a Smart Contract code for a blockchain entry corresponding to the data file;
performing, at the blockchain node, a hashing operation on information from a previous blockchain entry and information provided from the data storage device to generate the blockchain block; and
providing the reference number from the blockchain node to the data storage device, the reference number based on the hashing operation.

7. The method of claim 6 further comprising:
distributing the blockchain entry from the blockchain node to a plurality of additional blockchain nodes for incorporation into distributed ledgers maintained by each of the plurality of additional blockchain nodes.

8. The method of claim 6 further comprising:
receiving, at the blockchain node from a web application, the reference number to access the blockchain entry;
executing the Smart Contract code of the blockchain entry based on receiving the reference number, the Smart Contract code configured to:
retrieve the network link from the blockchain block;
access the data file at the cloud server using the network link; and
provide origination details to the web application for the data file based on the blockchain block and the data file at the cloud server.

9. A system comprising:
a data storage drive including:
a data storage medium;
a processor configured to:
receive a data file to store to the data storage medium;
transmit the data file to a cloud server;
receive, from the cloud server in response to transmitting the data file, a network link to access the data file at the cloud server;
send, to a blockchain node in a network, a request to generate a blockchain block corresponding to the data file, the request including the network link;
receive, from the blockchain node, a reference number corresponding to the blockchain block, the reference number enabling access to the blockchain block; and
provide the reference number in response to receiving the data file to store.

10. The system of claim 9, the processor further configured to:
generate a hash of the data file; and
send the hash to the blockchain node for incorporation into the blockchain block.

11. The system of claim 9, the processor further configured to:
generate metadata for the data file, including information identifying creation details of the data file; and
send the metadata to the blockchain node for incorporation into the blockchain block.

12. The system of claim 11 further comprising:
the metadata includes pre-set user information identifying a creator of the data file, the user information stored to the data storage drive prior to creation of the data file.

13. The system of claim 9, the processor further configured to:
maintain a dedicated storage location of the data storage medium;
based on the data file being stored to the dedicated storage location, automatically:
transmit the data file to the cloud server; and
send the request to generate the blockchain block corresponding to the data file to the blockchain node.

14. The system of claim 9, further comprising:
the blockchain node, including a network-connected computing system, the blockchain node configured to:
receive, from the data storage drive, the request to generate the blockchain block;
add a Smart Contract code for a blockchain entry corresponding to the data file;
perform a hashing operation on information from a previous blockchain entry and information provided from the data storage device to generate the blockchain block; and
provide the reference number to the data storage drive, the reference number based on the hashing operation.

15. The system of claim 14, the blockchain node further configured to:
distribute the blockchain entry from the blockchain node to a plurality of additional blockchain nodes for incorporation into distributed ledgers maintained by each of the plurality of additional blockchain nodes.

16. The system of claim 14, the blockchain node further configured to:
receive, from a web application, the reference number to access the blockchain entry;
execute the Smart Contract code of the blockchain entry based on receiving the reference number, the Smart Contract code configured to:
retrieve the network link from the blockchain block;
access the data file at the cloud server using the network link; and
provide origination details to the web application for the data file based on the blockchain block and the data file at the cloud server.

17. A memory device storing instructions that, when executed, cause a processor to perform a method comprising:
receiving, at a data storage device, a data file to store;
transmitting, from the data storage device to a cloud server, the data file;
receiving, at the data storage device from the cloud server, a network link to access the data file at the cloud server;
sending, from the data storage device to a blockchain node in a network, a request to generate a blockchain block corresponding to the data file, the request including the network link;
receiving, at the data storage device from the blockchain node, a reference number corresponding to the blockchain block, the reference number enabling access to the blockchain block; and
providing the reference number from the data storage device in response to receiving the data file to store.

18. The memory device of claim 17 that, when executed causes the processor to perform the method further comprising:
generating, at the data storage device, a hash of the data file; and
sending the hash from the data storage device to the blockchain node for incorporation into the blockchain block.

19. The memory device of claim 17 that, when executed causes the processor to perform the method further comprising:
- generating, at the data storage device, metadata for the data file, including:
  - information identifying creation details of the data file;
  - pre-set user information identifying a creator of the data file, the user information stored to the data storage device prior to creation of the data file; and
- sending the metadata from the data storage device to the blockchain node for incorporation into the blockchain block.

20. The memory device of claim 17 that, when executed causes the processor to perform the method further comprising:
- maintaining, at the data storage device, a dedicated storage location;
- based on the data file being stored to the dedicated storage location, automatically performing, at the data storage device:
  - transmitting the data file to the cloud server; and
  - sending the request to generate the blockchain block corresponding to the data file to the blockchain node.

\* \* \* \* \*